United States Patent [19]

Reaux

[11] Patent Number: 5,209,522
[45] Date of Patent: May 11, 1993

[54] ANTI-EXTRUSION APPARATUS FOR AN INWARDLY COMPRESSED SEAL

[75] Inventor: James R. Reaux, Lafayette, La.

[73] Assignee: Oceaneering International, Inc., Houston, Tex.

[21] Appl. No.: 867,956

[22] Filed: Apr. 13, 1992

[51] Int. Cl.⁵ .............................. F16L 55/18
[52] U.S. Cl. .................... 285/15; 285/147; 285/323; 285/348; 285/363; 285/910
[58] Field of Search .......... 285/15, 108, 348, 374, 285/910, 147, 323, 363, 910

[56] References Cited

U.S. PATENT DOCUMENTS

| | | |
|---|---|---|
| 2,163,810 | 6/1939 | Raybould .................... 285/348 X |
| 3,074,747 | 1/1963 | Boughton ................... 285/348 X |
| 3,078,332 | 2/1963 | Marx ......................... 285/910 X |
| 4,030,741 | 6/1977 | Fidrych ..................... 285/348 X |
| 5,056,830 | 10/1991 | Reaux ....................... 285/15 |

Primary Examiner—Dave W. Arola
Attorney, Agent, or Firm—Fulbright & Jaworski

[57] ABSTRACT

An anti-extrusion apparatus for a seal sealing on the outside diameter of a conduit. The anti-extrusion device is positioned at each end of the seal and includes a metal ring engaging an end of the seal in which the ring has a wedge shaped inside. A plurality of arcuate ring segments form a close ring having inner diameter equal to the outside diameter of the conduit. The segments have a wedge shaped outside coacting with the metal ring and are wedged inwardly against the conduit prior to compression of the seal for reducing extrusion of the seal as it is compressed.

10 Claims, 3 Drawing Sheets

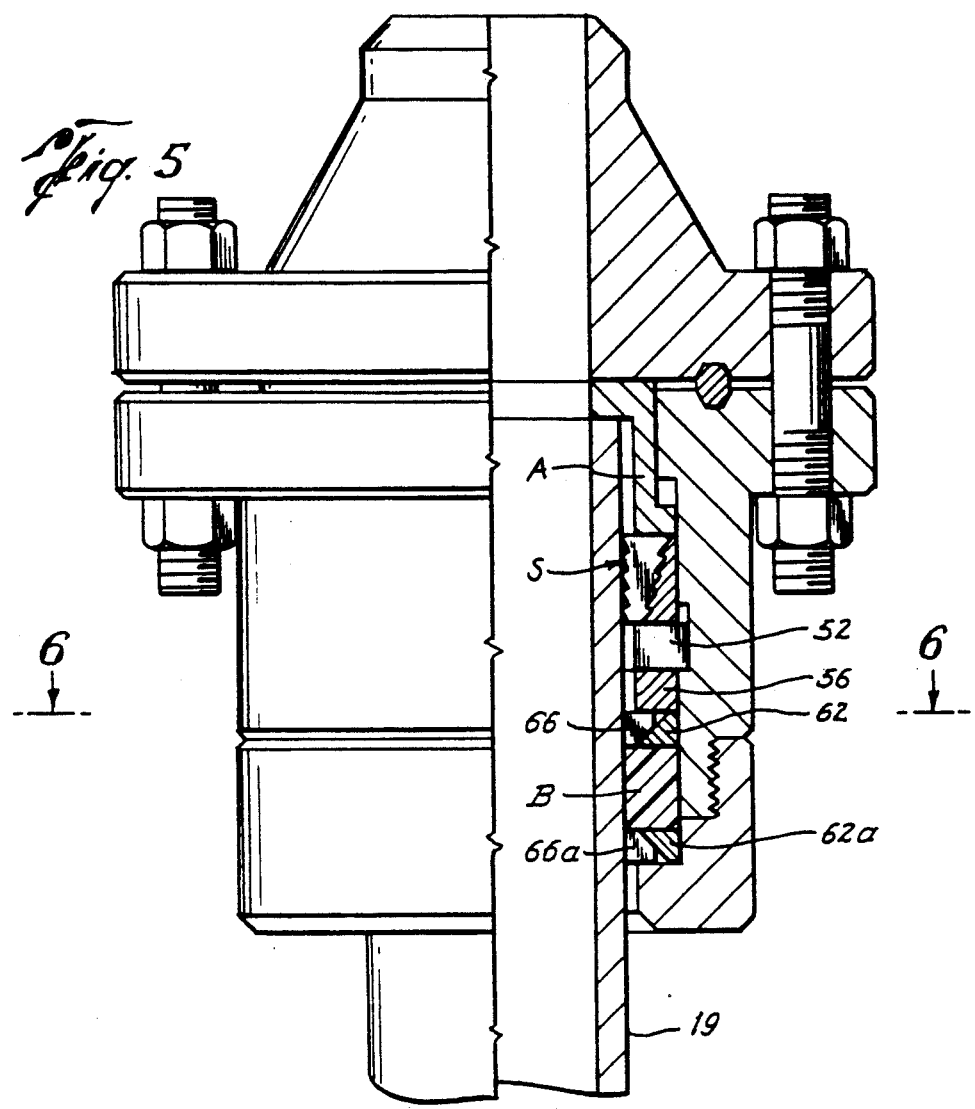
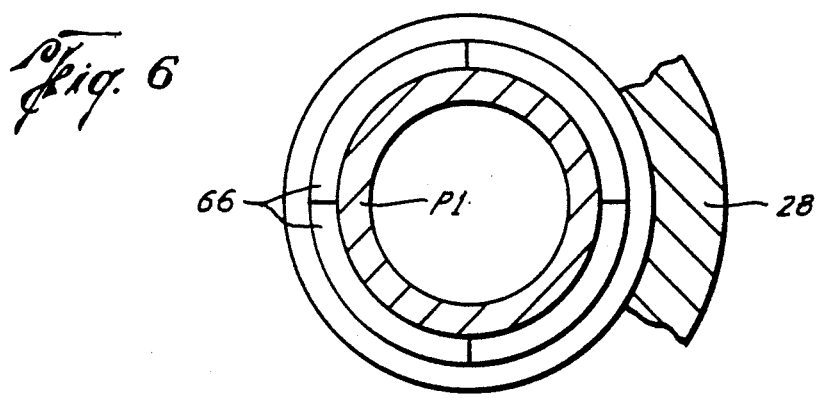
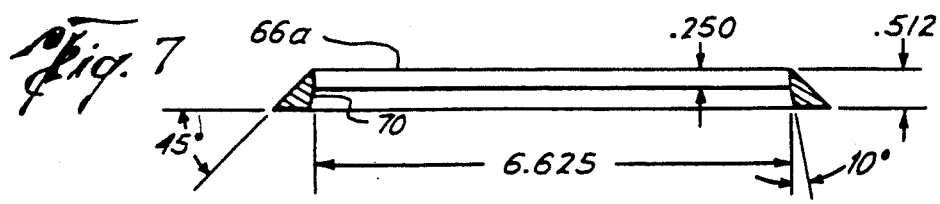

ANTI-EXTRUSION APPARATUS FOR AN INWARDLY COMPRESSED SEAL

BACKGROUND OF THE INVENTION

The present invention relates to an anti-extrusion device for supporting an inwardly compressed seal which is sealing around the outside diameter of a conduit such as a pipe.

Various types of seals have been disclosed for sealing on the outside diameter of a pipeline, such as in my U.S. Pat. No. 5,056,830. The seal and actuating mechanism must be sufficiently retracted to an unactuated position in order to allow the sealing mechanism to receive or be inserted over the outside of the pipe. However, when the seal is compressed and moves inwardly to engage and set and seal against the outside of the pipe the backup supports on each end of the seal do not engage the outside of the pipe thereby leaving a gap or space into which the seal is extruded upon setting. Such extruded seals are subject to failure because they are not able to accomplish their intended function of sealing off against the required pressures.

The present invention is directed to an anti-extrusion device for engaging the outside of a conduit and the opposite ends of a seal and limiting its extrusion thereby allowing the seal to properly set and hold higher pressures.

SUMMARY

The present invention is directed to an anti-extrusion apparatus for a seal sealing on the outside diameter of a conduit and includes a housing having a bore therethrough for receiving the conduit and the seal is positioned in the housing and has a bore therethrough for receiving the conduit. Means are provided on opposite ends of the seal for compressing the seal inwardly into a sealing engagement with the conduit. Anti-extrusion means are positioned between the compressing means and each end of the seal. Each anti-extrusion means includes a metal ring in the housing coaxially with the bore having an outside engaging the inside of the housing, and having a wedge shaped inside. A plurality of arcuate ring segments form a closed ring having an inner diameter equal to the outside diameter of the conduit. The segments include a wedge shaped outside coacting with the wedge shaped inside of the metal ring whereby the ring segments may be expanded outwardly to allow admission of the conduit therethrough, but which are wedged inwardly against the conduit on actuation of the compressing means for reducing extrusion of the seal as it is compressed.

Still a further object of the present invention is wherein the metal ring engages the seal.

Yet a further object of the present invention is wherein the segments engage the metal ring on a side opposite the seal.

Another object of the present invention is wherein one set of segments includes an inside taper for receiving the conduit.

Still a further object of the present invention is wherein one of the segments is longer than the other segments of each closed ring.

Yet a still further object of the present invention is the provision of a repair coupling for connecting a first open ended pipe section to a first flange including a coupling flange sealingly engagable with the first flange in which the coupling flange includes a cylindrical body having an inner diameter bore greater in diameter than the outside diameter of the first open ended pipe section to be received therein with an annulus therebetween and having a radially inwardly directed wall at each end of the annulus. Piston means are positioned within the annulus and with a head portion extending from the coupling flange to be depressed by the first flange. Slip means and packing means are provided with the annulus for anchoring and sealing against the pipe section by the piston means by means drawing the two flanges together. A ring is positioned in the annulus between the slip means and the packing means and means engagable with the ring limit the movement of the ring towards the packing means. The improvement of an anti-extrusion device is provided at each end of the seal and includes a metal ring in the housing coaxial with the bore having an outside engaging the inside of the housing, and having a wedge shaped inside. A plurality of arcuate ring segments form a closed ring having an inner diameter equal to the outside diameter of the open ended pipe and the segments have a wedge shaped outside coacting with the wedge shaped inside of the metal ring.

Other and further objects, features and advantages will be apparent from the following description of a present preferred embodiment of the invention, given for the purpose of disclosure, and taken in conjunction with the accompanying drawings.

BRIEF DESCRIPTION OF THE DRAWINGS

FIG. 5 is an elevational view, in quarter section, of the apparatus of FIGS. 1 and 3 shown in the set position, FIG. 6 is a cross-sectional view taken along the line 6—6 of FIG. 5, and FIG. 7 is a cross-sectional view of the preferred embodiment of the lower ring segments.

BRIEF DESCRIPTION OF THE PREFERRED EMBODIMENT

While the anti-extrusion apparatus of the present invention is useful for limiting the extrusion of a seal compressed on and sealing against the outside diameter of any pipe or conduit, it will be described, for purposes of illustration only, as used in a flange repair coupling for pipeline service, such as described in U.S. Pat. No. 5,056,830.

Figure 1:
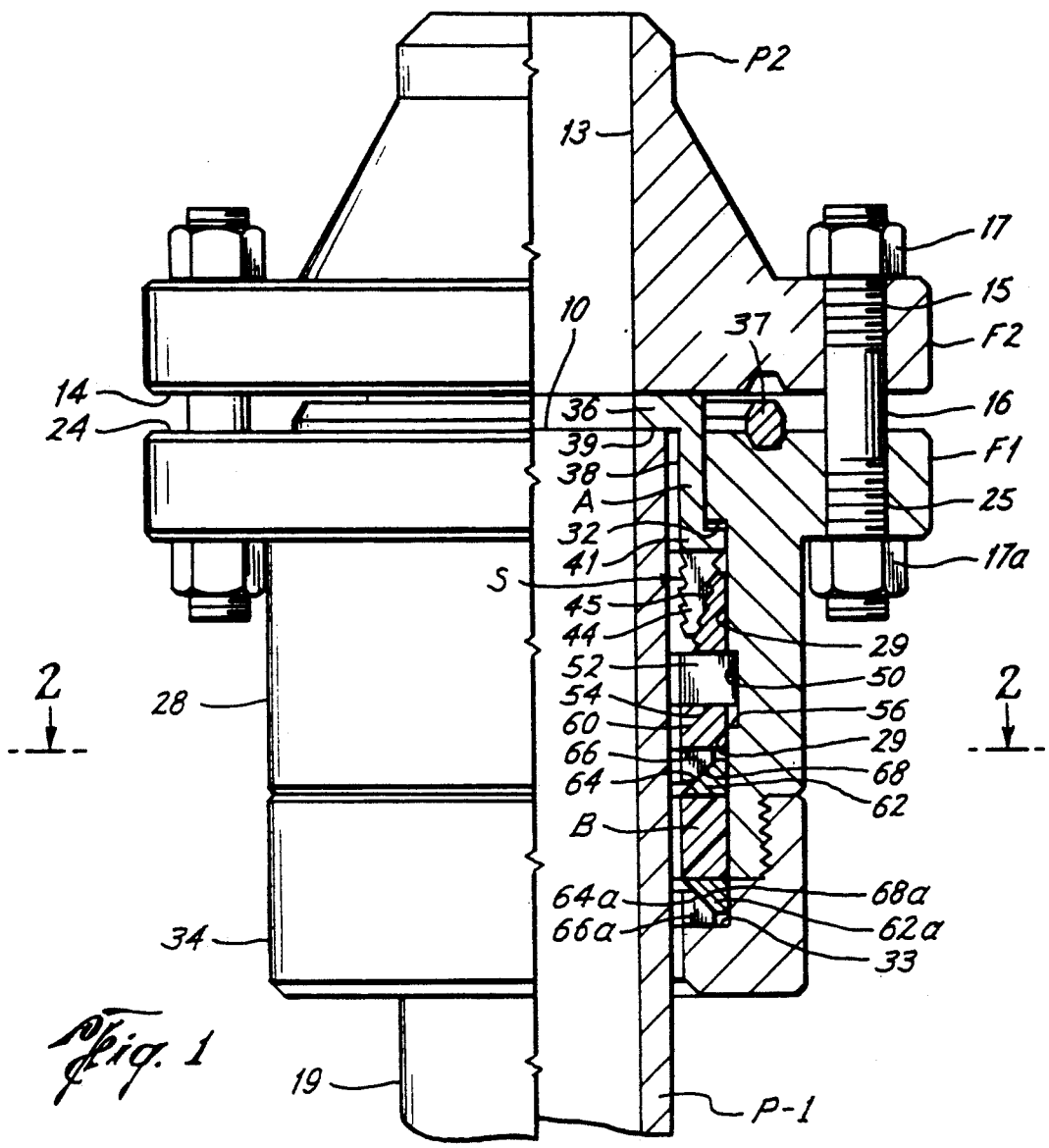
FIG. 1 is an elevational view, in quarter section, of the parts of the present invention in position prior to setting.
Figure 2:
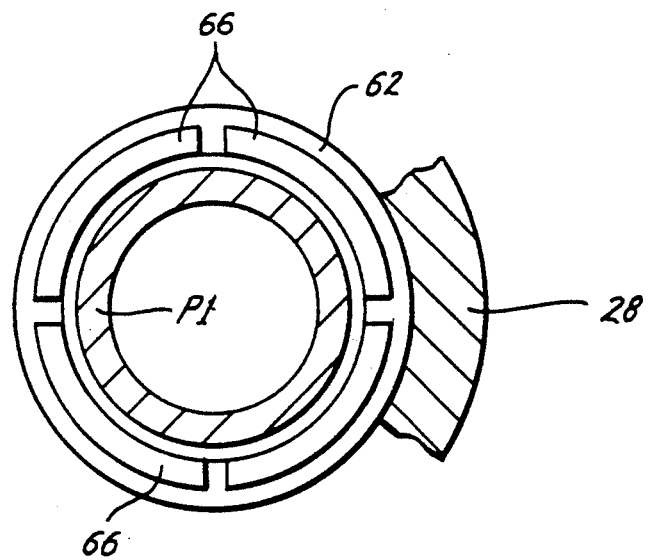
FIG. 2 is a cross-sectional view taken along the line 2—2 of FIG. 1.
Figure 3:
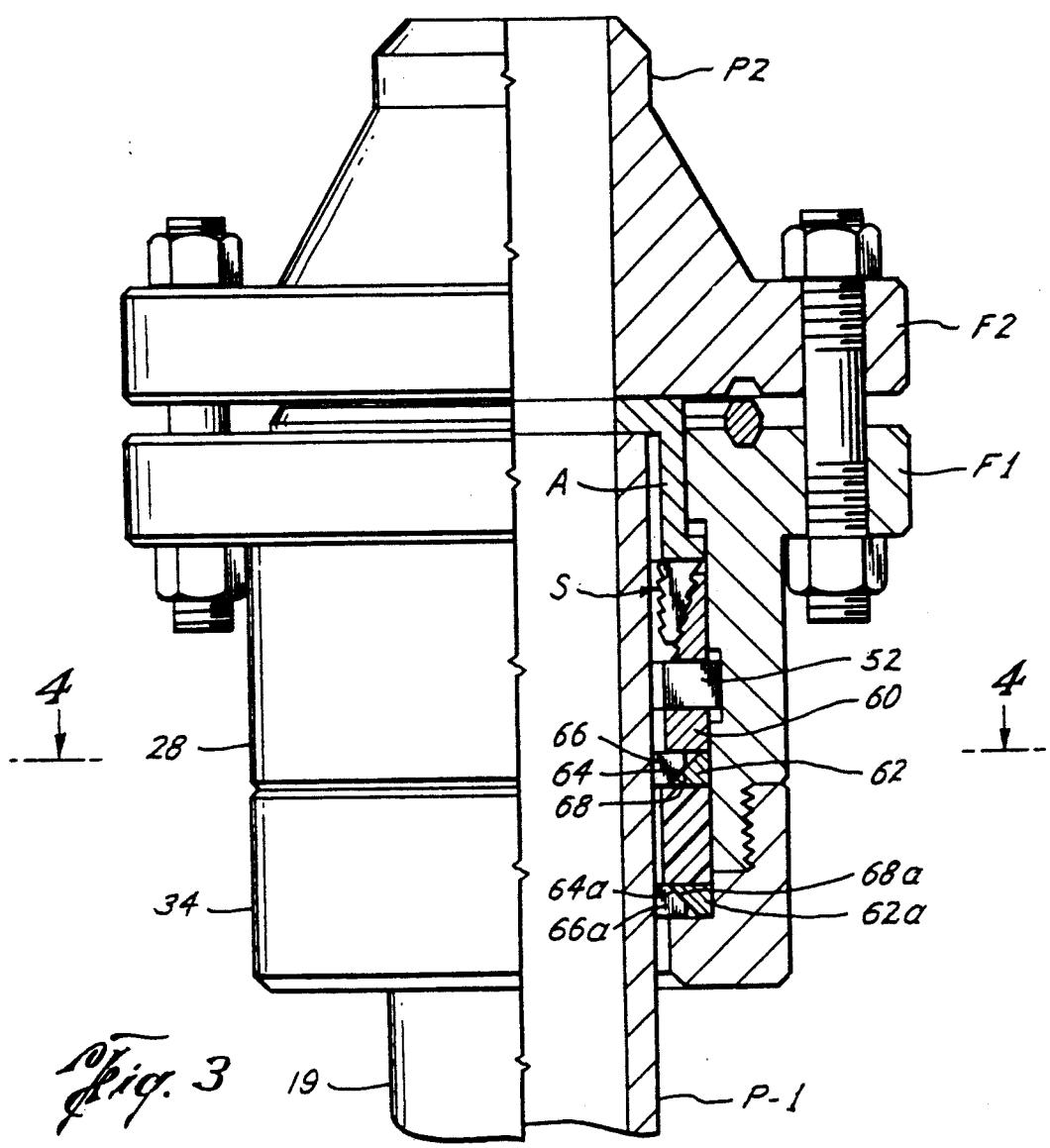
FIG. 3 is an elevational view, in quarter-section of the apparatus of FIG. 1 with the anti-extrusion device set.

Referring now to the drawings, the flanged repair coupling C is a unit that is slidable over the open end of one pipe section P1 and engagable with the open end of another pipe section P2. The pipe section P1 is a new or old section of pipe that has been cut off to have an open end 10 substantially normal to its axis and the exterior 19 is cleaned for entering the coupling C as shown in FIGS. 1, 3 and 5. The pipe section P2 includes a flange F2 which may be a standard pipe flange having a bore 13. Flange F2 has a sealing face 14 and circumferential bolt holes 15 surround the face 14 to receive studs 16.

The flange F1 includes a sealing face 24, and a circumferential bolt pattern of holes 25 for receiving the studs 16 to draw the flanges together when nuts 17 and 17a are tightened. The flange F1 includes a cylindrical body 28 having a bore 29 that extends over the open end portion of pipe section P1 leaving a concentric annulus between its inner diameter 29 and the exterior diameter 19 of the pipe section P1. Body 28 includes radially inwardly directed walls 32 and 33 at opposite ends. The flange F1 and body 28 accommodate an actuator or piston means A, a packing or seal means B, and an anchor or slip means S. The wall 33 is preferably provided by a screw-on cap 34 threaded onto the exterior of the body 28 and having a bore slidably over the diameter 19 of the pipe section P1.

The piston means A is mechanically operated by engagement with the face 14 of flange F2 in order to axially compress the packing means B and set the slips S between the piston A and the wall 33. A surrounding standard joint ring seal 37 engages both faces 14 and 24 in the usual manner. The piston means A includes a cylindrical portion 38 which carries a head portion 36 having a shoulder 39 to engage the open end 10 of pipe P1. The cylinder portion 38 also carries ram portion 41 that slidably occupies the annulus between the body 28 and the pipe P1.

The packing means B may be any suitable compressible material such as buna N elastomer or viton or a metal seal. The packing means B is a right cylinder with a bore to receive the pipe P1.

The anchor or slip means S is shown as an inwardly tapered split ring 44, or separate slip wedges, operable inwardly and downwardly on a complementary conical surface 45 so as to be forced radially inwardly upon downward movement of the split ring 44 which bites into the exterior surface 19 of the pipe P1.

The body 28 includes a cylindrical recess 50 adjacent the bore 29 for receiving a ring 52 which is positioned in the annulus between the slip means S and the packing means B. Preferably, for ease of manufacturing, the ring 52 is a discontinuous ring for insertion into the recess 50 through the bore 29. Thus, the ring 52 may be a split ring or preferably a segmented ring. Means are provided engagable with the ring 52 for limiting the movement of the ring towards the packing means B. Thus, coacting shoulders 54 and 56 are provided between the ring 52 and body 28 thereby insuring that any load from tension in the pipe P1 is transferred through the slips S and segmented ring 52 to the body 28 and not to the elastomer seal B.

A second continuous ring 60 may be provided. Preferably, the outside diameter of the second ring 60 is less than the outside diameter of the first ring 52. That is, the outside diameter of the second ring 60 is aligned with the bore 29 of the housing 28 and the outside diameter of the packing means B.

In order to protect the seal B when it is compressed between the piston A and the wall 33 into a sealing relationship with the outside diameter 19 of the pipe P1, an anti-extrusion means are provided at each end of the seal B. Each of the anti-extrusion means includes a metal ring in the body 28 coaxially with the bore 29 and having an outside engaging the inside of the body 28. Thus, a metal ring 62 and ring 62a are provided on opposite sides of the seal B having an outside engaging the inner wall of the body 28. Each of the rings 62 and 62a include a wedge shaped inside 64 and 64a, respectively. A plurality of arcuate ring segments form a closed ring having an inner diameter equal to the outside diameter of the type P1. Thus, a plurality of ring segments 66, here shown as four although any suitable number may be provided are positioned on one side of the seal B and a similar plurality of segments 66a are provided on the opposite side of the seal B. These segments 66 and 66a have a wedge shaped outside 68 and 68a, respectively, for coacting with the wedge shaped insides 64 and 64a of the rings 62 and 62a, respectively.

Figure 4:
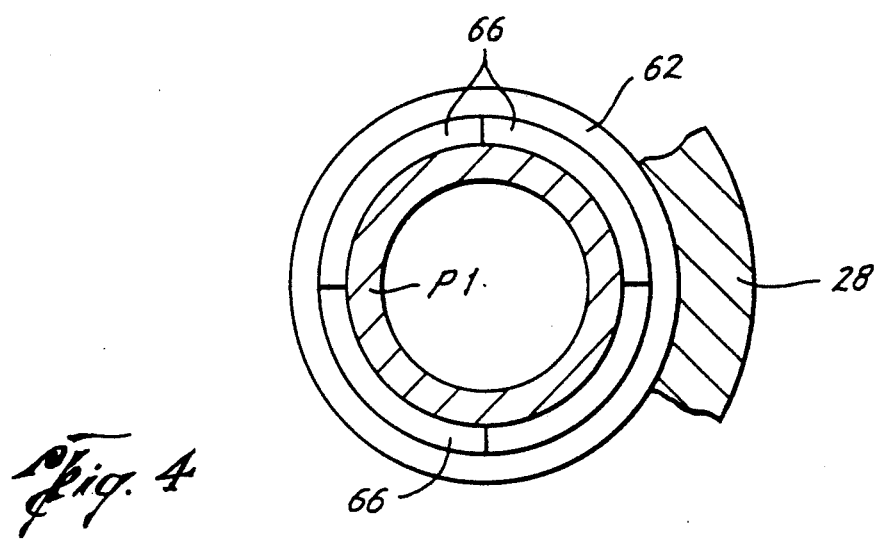
FIG. 4 is a cross-sectional view taken along the line 4—4 of FIG. 3.

In operation, the parts are assembled, as best seen in FIG. 1, preferably with the lower nut 17a trapped by the flange housing 28 to simplify installation. Torque is applied to the upper nut 17 thereby automatically drawing the flange F1 towards F2 as best seen in FIG. 3. This actuates the piston means 28 towards the lower wall 33 moving the rings 52 and 60 downwardly and causing the ring segments 66 and 66a to move inwardly and engage the outside diameter 19 of the pipe P1 as best seen in FIGS. 3 and 4. That is, movement of the piston means A causes the ring segments 66 and 66a to move inwardly relative to the metal rings 62 and 62a, respectively because of the coacting wedge shaped surfaces. Therefore, as best seen in FIGS. 3 and 4 the ring segments 66 and 66a close together forming a closed ring having an inner diameter equal to the outside diameter 19 of the pipe P1. Because the segments form a closed ring the seal B is prevented from extruding as it is set. Continued movement of the piston means A relative to wall 33 also applies axial pressure to slip means S and the seal means B. The seal means B is set into a seating relationship with the outside 19 of the pipe P1, as best seen in FIG. 5. Generally the seal means B is set and the slip means S engages the exterior 19 of the pipe P1 as the flanges F1 and F2 are brought together by the studs 16.

In making the arcuate ring segments 66 and 66a a solid ring having an inner diameter equal to the outside diameter 19 of the pipe P1 may be utilized which is then cut such as sawing into the desired segments. However, because of the cutting of the solid ring the resulting ring segments will no longer provide a closed ring when they are placed around the outside diameter 19 of the pipe P1. Therefore, if the cut segments were used there would be a space between their ends which would cause extrusion of the seal B. For example only, if the saw cut was 1/16" and four segments were made out of a solid ring then there would be a total gap area of ¼" when the ring segments were placed around the outside diameter 19. Therefore, in order to insure that the arcuate ring segments will form a closed ring having an inner diameter equal to the outside diameter 19 of the pipe P1 one of the cut segments is discarded and a new segment from another ring is provided which is longer than the original discarded segment and is used to insure that the cut segments will form a closed ring thereby preventing extrusion of the seal B.

Referring to FIG. 7, the preferred shape of lower ring 66a is best seen. For purposes of illustration only, numerical dimensions are given for one particular sized apparatus 10. However, it is to be noted that the inside of ring segments 66a include a taper 70, here shown as ten degrees. The purpose of taper 10 is to allow entrance of the open end of pipe section P1 to pass by segments 66a without catching and at the same time to push the segments 66a out of the way and into a retracted position. The taper 70 is positioned away from the seal means B and thus does not affect the anti-extrusion action of the segments 66a.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts, will be readily apparent for those skilled in the art, and which are encompassed within the spirit of the invention, and the scope of the appended claims.

What is claimed is:

1. An anti-extrusion apparatus for a seal sealing on the outside diameter of a conduit comprising, a seal,
   a body having a bore therethrough for receiving said conduit,
   said seal positioned in the body and said seal having a bore therethrough for receiving said conduit,
   means on opposite ends of the seal for compressing the seal inwardly into a sealing engagement with the conduit,
   anti-extrusion means between the compressing means and each end of the seal, each said anti-extrusion means including, a metal ring in the body coaxial with the bore having an outside engaging the inside of the body and having a wedge shaped inside, a plurality of accurate ring segments forming a closed ring having an inner diameter equal to the outside diameter of the conduit, said segments having a wedge shaped outside coacting with the wedge shaped inside of the metal ring whereby the ring segments may be expanded outwardly to allow admission of the conduit therethrough, but which are wedged inwardly against the conduit on actuation of the compressing means for reducing extrusion of the seal as it is compressed.

2. The apparatus of claim 1 wherein said metal ring engages the seal.

3. The apparatus of claim 2 wherein said segments engage the metal ring on a side opposite the seal.

4. The apparatus of claim 3 wherein one of the plurality of ring segments includes a taper on their inside for allowing the passage of said conduit.

5. The apparatus of claim 1 wherein one of segments is circumferentially larger than the other segments of each closed ring.

6. In a repair coupling for connecting a first open ended pipe section to a first flange including a coupling flange sealingly engagable with the first flange, said coupling flange including a cylindrical body having an inner diameter bore greater in diameter than the outside diameter of the first open ended pipe section to be received therein with an annulus therebetween and having a radially inwardly directed wall at each of the annulus, piston means positioned within the annulus and with a head portion extending from the coupling flange to be depressed by the first flange, slip means and sealing means within the annulus for anchoring and sealing against the pipe section by the piston means, means to draw the two flanges together, a ring positioned in the annulus between the slip means and the packing means, means engagable with the ring limiting the movement of the ring towards the packing means, the improvement in an anti-extrusion means adjacent each end of the sealing means wherein each said anti-extrusion means comprises,
   a metal ring positioned in the annulus having an outside engaging the inside of the cylindrical body, and having a wedge shaped inside,
   a plurality of arcuate ring segments forming a closed ring having an inner diameter equal to the outside diameter of the first open ended pipe section, said segments having a wedge shaped outside coacting with the wedge shaped inside of the metal ring whereby the ring segments may be expanded outwardly to allow admission of the open ended pipe section, but which are wedged inwardly against the open ended pipe section by the piston means for reducing extrusion of the sealing means as it is compressed.

7. The apparatus of claim 6 wherein said metal ring engages the seal.

8. The apparatus of claim 7 wherein said segments engage the metal ring on a side opposite the sealing means.

9. The apparatus of claim 8 wherein the plurality of ring segments remote from the coupling flange includes a taper on their inside for allowing passage of said pipe sections.

10. The apparatus of claim 6 wherein one of the segments is longer than the other segments of each closed ring.

* * * * *